US008783772B2

(12) United States Patent
Schüler et al.

(10) Patent No.: US 8,783,772 B2
(45) Date of Patent: Jul. 22, 2014

(54) VEHICLE SEAT, IN PARTICULAR UTILITY VEHICLE SEAT

(75) Inventors: Rolf Schüler, Heiligenhaus (DE);
Christoph Schuhn, Düsseldorf (DE);
Heinz Voss, Leverkusen (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 401 days.

(21) Appl. No.: 13/170,602

(22) Filed: Jun. 28, 2011

(65) Prior Publication Data

US 2012/0001468 A1     Jan. 5, 2012

(30) Foreign Application Priority Data

Jul. 1, 2010   (DE) .......................... 10 2010 026 015

(51) Int. Cl.
*B60N 2/16*     (2006.01)
*B60N 2/04*     (2006.01)

(52) U.S. Cl.
USPC ................................ 297/344.16; 297/344.15

(58) Field of Classification Search
USPC ........ 297/344.15, 344.16, 325; 248/588, 404, 248/157
See application file for complete search history.

(56) References Cited

U.S. PATENT DOCUMENTS

| | | |
|---|---|---|
| 4,799,403 A | 1/1989 | Dinkel et al. |
| 5,058,852 A | 10/1991 | Meier et al. |
| 6,264,163 B1 * | 7/2001 | Ivarsson .................. 248/588 |
| 7,575,206 B2 * | 8/2009 | Meier et al. ............. 248/161 |
| 8,303,037 B2 | 11/2012 | Weber et al. |
| 8,439,324 B2 | 5/2013 | Hake et al. |

FOREIGN PATENT DOCUMENTS

| | | |
|---|---|---|
| CN | 101010217 A | 8/2007 |
| CN | 101616819 A | 12/2009 |
| DE | 78 35 259 U1 | 5/1979 |
| DE | 28 49 700 A1 | 5/1980 |
| DE | 33 33 604 A1 | 3/1985 |
| DE | 35 17 505 C2 | 3/1987 |
| DE | 40 25 183 C1 | 11/1991 |
| DE | 43 35 199 C1 | 5/1995 |
| DE | 103 54 635 B4 | 9/2006 |
| DE | 102006017774 A1 | 10/2007 |
| GB | 2010437 A | 6/1979 |

\* cited by examiner

*Primary Examiner* — Milton Nelson, Jr.
(74) *Attorney, Agent, or Firm* — McGlew and Tuttle, P.C.

(57) ABSTRACT

A vehicle seat, in particular a utility vehicle seat, has a seat frame which can be pivoted by a pneumatic spring and which can be adjusted in terms of height. An adjuster (20) establishes the actual value of the height of the seat frame. The adjuster (20) has a cable roll (22) which is supported on a first portion of the seat frame so as to be able to be rotated about an axis (A), and a cable (24), which can be at least partially wound on the cable roll (22), unwound therefrom and is secured to a second portion of the seat frame that can be moved relative to the first portion, and which controls at least one control valve (36) of the pneumatic spring in accordance with a desired value of the height of the seat frame. A gear mechanism (30) creates an operational connection, in particular a gear connection, between the cable roll (22), a desired value generator (32), by which the desired value of the height of the seat frame can be adjusted, and a control device (34) which controls the at least one control valve (36).

20 Claims, 4 Drawing Sheets

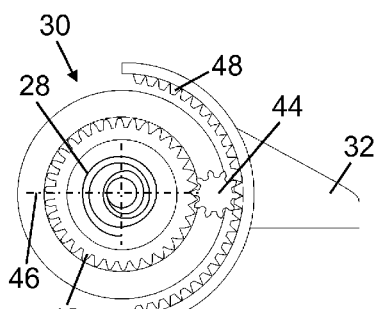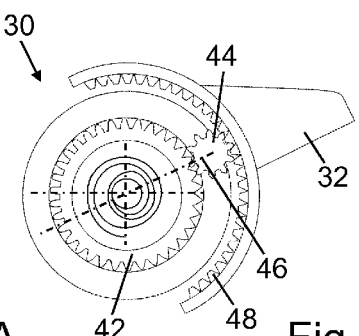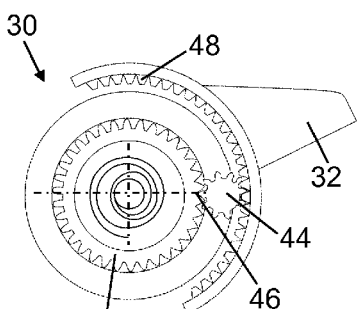
Fig. 5A   Fig. 6A   Fig. 7A
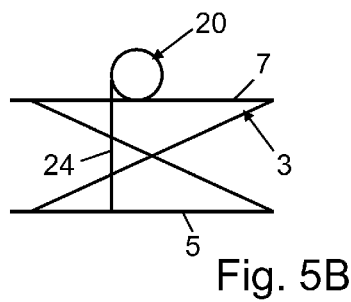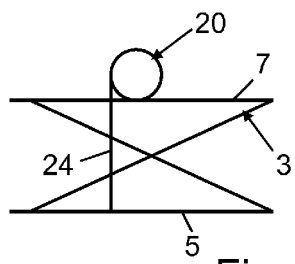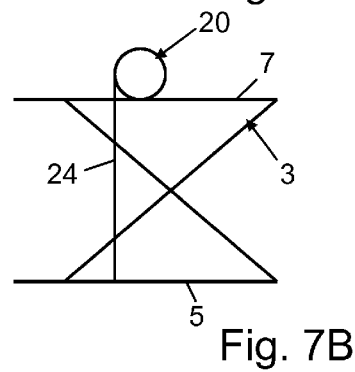
Fig. 5B   Fig. 6B   Fig. 7B

VEHICLE SEAT, IN PARTICULAR UTILITY VEHICLE SEAT

CROSS REFERENCE TO RELATED APPLICATIONS

This application claims the benefit of priority under 35 U.S.C. §119 of German Patent Application DE 10 2010 026 015.0 filed Jul. 1, 2010, the entire contents of which are incorporated herein by reference.

FIELD OF THE INVENTION

The invention relates to a vehicle seat, in particular a utility vehicle seat, having a seat frame which can be pivoted by means of a pneumatic spring and which can be adjusted in terms of height and an adjuster which establishes the actual value of height of the seat frame.

BACKGROUND OF THE INVENTION

DE 28 49 700 A1, DE 33 33 604 A1, DE 43 35 199 C1 or DE 10 2006 017 774 A1 describe height adjustable vehicle seats with level control. There is provided in each case for the level control a control circuit which comprises the seat frame, the pneumatic spring and the control device including a sensing member, sliding control member and valve device. If the actual value of the height, which is established, for example, as the differential angle between the cranks, differs from the desired value, generally owing to a deflection of the seat frame, the pneumatic spring is controlled in such a manner that it acts counter to the deflection, and the actual value again reaches the desired value. For the height adjustment, the desired value is modified in accordance with the height which is to be newly adjusted, so that the level control treats the current actual value as a deviation from the desired value and moves the seat frame to the desired new height. In the case of technical implementation, known vehicle seats have a partially complex structure. In addition, an increase in the precision of the level control and the height adjustment would also be desirable.

DE 103 54 635 B4 proposes a vehicle seat of the type mentioned in the introduction, in which the precision of the establishment of the actual value is increased by using a cable roll with a cable (in place of measuring the angle between the cranks). The position of the cable roll is magnetically detected and electrically evaluated, which makes the solution costly.

SUMMARY OF THE INVENTION

An object of the invention is to improve a vehicle seat of the type mentioned in the introduction.

According to the invention, a vehicle seat comprises a seat frame which can be pivoted by means of a pneumatic spring and which can be adjusted in terms of height and an adjuster which establishes the actual value of height of the seat frame. The adjuster has a cable roll which is supported on a first portion of the seat frame so as to be able to be rotated about an axis. The adjuster has a cable which can be at least partially wound on the cable roll, unwound therefrom and is secured to a second portion of the seat frame that can be moved relative to the first portion. The adjuster controls at least one control valve of the pneumatic spring in accordance with a desired value of the height of the seat frame. A gear mechanism creates an operational connection, in particular a gear connection, between the cable roll, a desired value generator, by means of which the desired value of the height of the seat frame can be adjusted, and a control device which controls the at least one control valve.

The use of a purely mechanical adjuster is cost-effective and less susceptible to malfunction. Using the gear mechanism, the establishment of the actual value, the presetting of the desired value and the control of the pneumatic spring are linked together in a simple and compact manner. The gear mechanism translates the actual value from the cable and provides it as an angle which is substantially larger than the differential angle of the cranks and compares the provided actual value and the desired value with each other so that the control device can react. The term "cable" is intended to refer to any flexible element which can be wound up, that is to say, for example, also a strap. Dynamic characteristics of the adjuster, for example, a hysteresis, can be defined by the geometry or the couplings of the components (for example, idle travel paths or damping systems). The adjustment of the height is carried out as an adjustment of the desired value for the adjuster. The adjuster can be positioned at extremely different locations in the vehicle seat.

The invention is explained in greater detail below with reference to an embodiment illustrated in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5A is a schematic view of a gear mechanism in the initial position;

FIG. 5B is a schematic view of a seat frame in the initial position;

FIG. 6A is the view corresponding to FIG. 5A directly after pivoting of a desired value generator;

FIG. 6B is the view corresponding to FIG. 5B directly after pivoting of a desired value generator;

FIG. 7A is the view corresponding to FIG. 6A after the new height is adjusted;

FIG. 7B is the view corresponding to FIG. 6B after the new height is adjusted.

DESCRIPTION OF THE PREFERRED EMBODIMENTS

Figure 1:
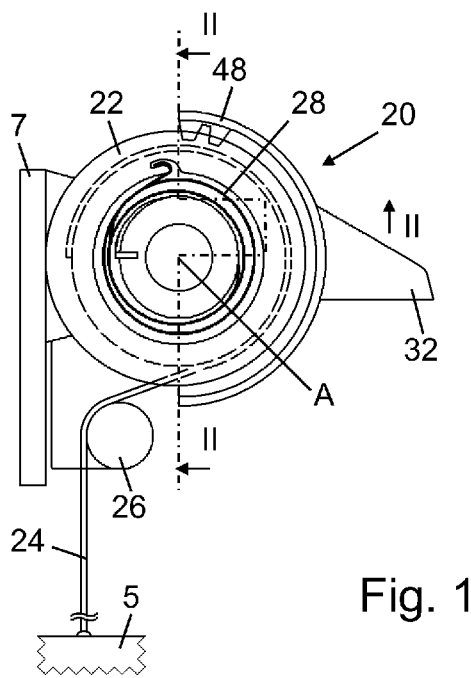
FIG. 1 is a partially schematic side view of an adjuster according to the invention.
Figure 4:
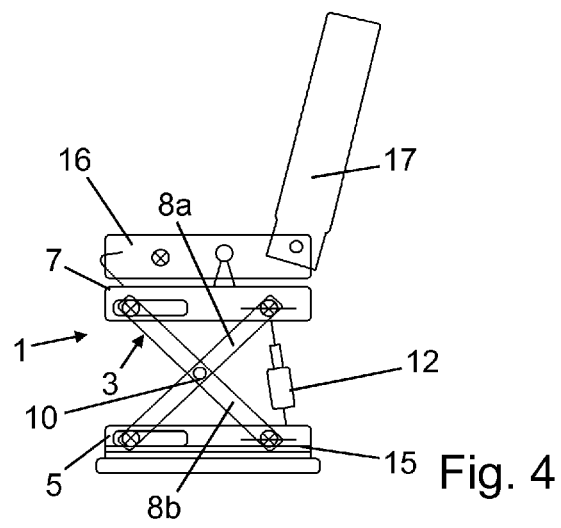
FIG. 4 is a schematic side view of a vehicle seat.
Figure 2:
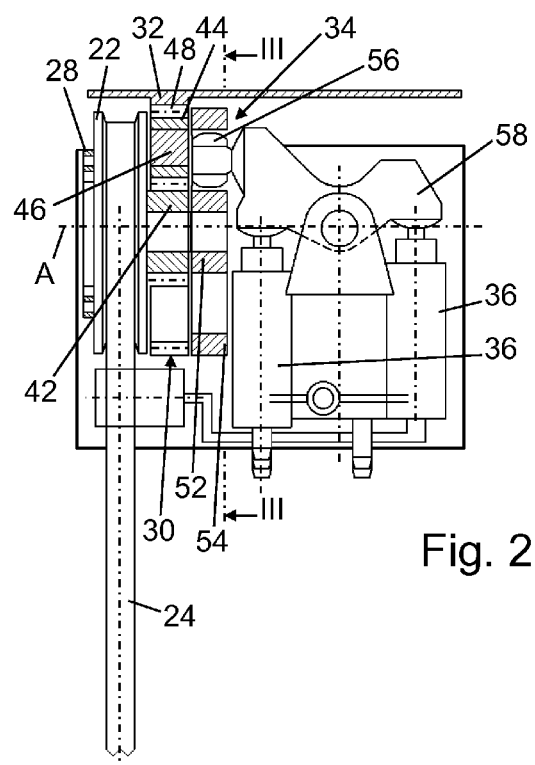
FIG. 2 is a section along line II-II in FIG. 1.

Referring to the drawings in particular, a vehicle seat 1 for a utility vehicle or another motor vehicle has a seat frame 3 which is constructed as a scissor type frame and which comprises a lower frame 5, an upper frame 7 which is arranged thereabove and at each of the two sides a pair of intersecting cranks 8a and 8b, respectively. A scissor shaft 10 connects the two intersection points and at the same time defines the axis about which the cranks 8a and 8b can pivot relative to each other. The cranks 8a and 8b are in each case articulated at the rear end thereof to the lower frame 5 or to the upper frame 7 and in each case have at the front end thereof rotatable rollers, by means of which they are guided in or on the upper frame 7 or lower frame 5 so as to be able to be moved in the longitudinal direction of the seat, respectively. Owing to this movement of the cranks 8*a* and 8*b*, the height of the upper frame 7 above the lower frame 5 changes, referred to briefly below as the height of the seat frame 3. Using a pneumatic spring 12 and preferably a damping device, the seat frame 3 becomes a pivotable system which increases the seat comfort.

The seat frame 3 in this instance can be displaced in the longitudinal direction of the seat by means of seat rails 15, as a result of which the vehicle seat 1 is longitudinally adjustable, that is to say, the longitudinal position of its seat can be adjusted. The vehicle seat 1 further has a seat frame 16 which is articulated on the one hand at the rear region thereof to the upper frame 7 at both sides and on the other hand can be raised and lowered in the front region thereof by means of an inclination adjustment device and can consequently be adjusted in terms of its inclination relative to the seat frame 3. The vehicle seat 1 also has a backrest 17 which is fitted to the seat frame 16 (or alternatively to the upper frame 7), in this instance so as to be able to be adjusted in terms of inclination.

The two pairs of intersecting cranks 8*a* and 8*b* each comprise a first crank 8*a* which is arranged at the outer side and a second crank 8*b* which is arranged at the inner side. The first two cranks 8*a* are connected to each other at the ends thereof by means of transverse pipes, as are the second cranks 8*b*. The transverse pipes which are at the front in each case at the same time support the rollers. The two second cranks 8*b* are further securely connected to each other by means of the scissor shaft 10 which is constructed as a pipe in this instance.

In order to adjust the height of the seat frame 3 and control the height (level control), that is to say, to maintain the adjusted height, an adjuster 20 is provided. In order to establish the actual value of the height, the adjuster 20 has a cable roll 22 (as an "actual value measurement device") which is supported on the upper frame 7 as a first portion of the seat frame 3 so as to be able to be rotated about an axis A. The orientation of the axis A can in principle be freely selected, for example, parallel with the scissor shaft 10 or in the longitudinal direction of the seat. The axis A defines the directional indications used below for a cylinder co-ordinate system. A cable 24 is secured to the cable roll 22 with one end. The cable 24 is partially wound on the cable roll 22, optionally guided and redirected by means of a deflection roller 26 (or a plurality of deflection rollers) and guided to the lower frame 5 as a second portion of the seat frame 3, where it is secured with the other end thereof. The cable roll 22 can alternatively be supported on the lower frame 5 and the cable 24 secured to the upper frame 7. The cable roll 22 is pretensioned by means of a spring 28, for example, a (flat) helical spring with respect to its bearing, that is to say, in this instance the upper frame 7, so that the cable 24 is always taut.

The adjuster 20 has a gear mechanism 30 which creates an operational connection, in particular a gear connection, between the cable roll 22, a desired value generator 32 and a control device 34. Using the desired value generator 32, the desired value of the height of the seat frame 3 can be predetermined. The control device 34 serves to control two control valves 36 of the pneumatic spring 12, of which one supplies air to the pneumatic spring 12 and the other vents the pneumatic spring 12. With respect to the axis A, the gear mechanism 30 is arranged axially offset relative to the cable roll 22 and the control device 34 is arranged axially offset relative to the gear mechanism 30.

The gear mechanism 30 is constructed in this instance as a planet gear in which a sun wheel 42 which is concentric relative to the axis A is connected to the cable roll 22 in a rotationally secure manner, preferably secured thereto or integrally constructed therewith, and at least one planet wheel 44 which is rotatably supported on a web 46 on the one hand engages with the sun wheel 42 and on the other hand with an internally toothed wheel 48 (which is also intended to be understood to refer to a segment of a complete internally toothed wheel). The internally toothed wheel 48 is connected to the desired value generator 32 in a rotationally secure manner, preferably secured thereto or constructed integrally therewith. The desired value generator 32 can preferably be pivoted about the axis A directly by the occupant of the vehicle seat 1 by means of an actuation element, for example, by means of a radial extension of the desired value generator 32.

The control device 34 has radially at the inner side a sliding inner member 52 and radially at the outer side an outer sliding member 54. The two sliding members 52 and 54 are constructed so as to be rotationally secure relative to each other and are operationally connected to the web 46. Preferably, the two sliding members 52 and 54 are provided together on a disc which can be supported rotatably about the axis A and which is supported, for example, on a bearing pin which is secured to the cable roll 22 or the sun wheel 42. The inner sliding member 52 is constructed, for example, on a central axial projection and the outer sliding member 54 on an axially protruding edge of the disc. The inner sliding member 52 and the outer sliding member 54 each have in the peripheral direction portions with different radial dimensions. The control device 34 further has a sliding roller 56 which is arranged radially between the inner sliding member 52 and the outer sliding member 54 and which can travel (or slide) thereon. The sliding roller 56 is supported on a rocker switch 58 which is pivotably supported upstream of both control valves 36. The rocker switch 58 converts the radial deflection of the sliding roller 56 relative to a central position of the sliding roller 56 into a pivot movement, in order to act on the control valves 36, that is to say, linearly movable tappets thereof.

FIG. 5A and FIG. 5B illustrate the initial position of the gear mechanism 30 and seat frame 3, all the components being located in a central position. If, in order to adjust a new height, the desired value generator 32 (and consequently the internally toothed wheel 48) is pivoted, the planet wheel 44 also travels and rotates the web 46 (FIG. 6A). The web 46 rotates the sliding members 52 and 54 together in a peripheral direction relative to the sliding roller 56. According to the path of the two sliding members 52 and 54, the rolling sliding member 56 is radially deflected. If the pivot movement of the rocker switch 58 from the central position thereof is correspondingly large, the rocker switch 58 acts on the next nearest of the two control valves 36 in the pivot direction. The arrangements can be selected in such a manner that a pivot movement of the desired value generator 32 supplies air to the pneumatic spring 12 in an upward direction and vents the pneumatic spring 12 in a downward direction.

If the pneumatic spring 12 changes the height of the seat frame 3 (from FIG. 6B to FIG. 7B), the cable roll 22 supported on the upper frame 7 is carried, whilst the end of the cable 24 secured to the lower frame 5 remains stationary. If the upper frame 7 is raised, the cable 24 is partially unwound from the rotating cable roll 22 owing to the pulling action in the cable 24 (counter to the pretension of the spring 28). If the upper frame 7 is lowered, the spring 28 rotates the cable roll 22 and the cable 24 is partially wound onto the rotating cable roll 22. The spring 28 ensures that the cable 24 remains taut, the tension of the spring 28 changing with the rotation of the cable roll 22. The cable roll 22 rotates the sun wheel 42 on which the planet wheel 44 travels and rotates the web 46, counter to the direction which has been brought about by the desired value generator 32. The sliding members 52 and 54 turn back again, the sliding roller 56 follows until it reaches its central position again (FIG. 7A) so that the rocker switch 58 pivots back into the central position thereof and releases the control valve 36 which has been acted upon until now so that it closes.

If, during the adjustment of the height (level control), the seat frame 3 is (highly) loaded or relieved, for example, statically owing to an occupant entering or leaving or dynamically owing to occurrences of unevenness in the road surface, the cable roll 22 rotates with the movement of the upper frame 7, as in the case described above. With the cable roll 22, the sun wheel 42 rotates and the planet wheel 44 runs as in the case of pivoting of the desired value generator 32. The control device 34 is controlled as described above, until the pneumatic spring 12 has again brought the seat frame 13 to the adjusted height. The geometry, in particular of the two sliding members 52 and 54 determines the hysteresis of this adjustment, in particular advantageous deceleration actions of the dynamics between the gear mechanism 30 and the actuation of the control valves 36.

Figure 3:
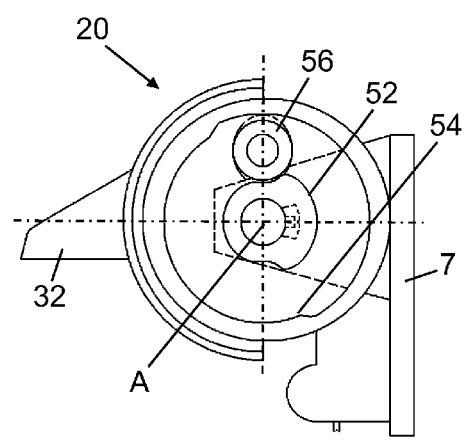
FIG. 3 is a section along line III-III in FIG. 2.
Figure 8:
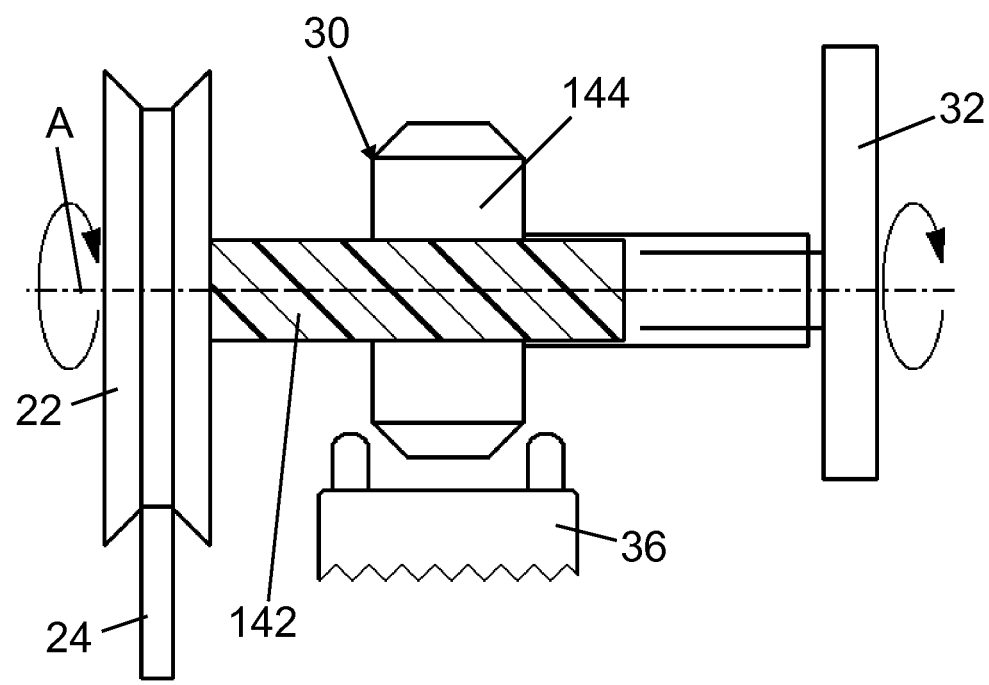
FIG. 8 is a schematic section through a modification of the adjuster.

The operational connection between the web 46 on the one hand and the two sliding members 52 and 54 on the other hand can be configured in such a manner that it is rotationally secure, for example, by the disc with the two sliding members 52 and 54 acting at the same time as a web. The operational connection can also be configured in such a manner that the web 46 on the one hand and the two sliding members 52 and 54 on the other hand are coupled so as to be carried so that an idle travel path can be created. For example, the disc or the like can be supported with the two sliding members 52 and 54 on a bearing pin which is securely connected to the web 46, there being formed between this bearing pin and the disc contours with an idle travel path, for example a carrier projection on the bearing pin of the web 46 and a carrier receiving member which is larger in the peripheral direction on the inner sliding member 52, which is indicated with dashed lines in FIG. 3. Differently formed squares may also be provided. In addition between the two assemblies, in particular in the intermediate space which defines the idle travel path, a viscous lubricant may be introduced so that the carrying action can be carried out with a damping effect. The hysteresis of the adjustment can thereby be refined.

Various modifications of the adjuster 20 are conceivable with respect to the embodiment. For example, it is possible to use only one control valve 36 which has two air outlets and which is controlled by means of a rotational movement of a valve shaft (instead of by a linear movement of a tappet). The control device 34 with the function of the sliding members 52 and 54 can be carried out, for example, in two successive planes or spatial spirals by means of simple control contours on the valve shaft, which is found to be advantageous with regard to the sealing of the rotational movement, the elimination of further deflections and the required structural space. The sliding members 52 and 54 can also be adjustable relative to each other, for example, by means of a rotational movement in order to influence the hysteresis.

In one modification, the gear mechanism 30 can be constructed as a spindle differential gear. The cable roll 22 then rotates a spindle 142 to which a spindle nut 144 is screwed. The desired value generator 32 is constructed so as to be rotationally secure with the spindle nut 144 and so as to run axially freely. Using the desired value generator 32, the spindle nut 144 can be rotated so that it also moves along the axis A of the spindle 142. The spindle nut 144 carries at the outer side a control contour which is thereby axially displaced in the plane of the tappets of the control valves 36 in order to be able to act (as a control device 34) on these tappets of the control valves 36. During the subsequent movement of the seat frame 3 and the cable roll 22 (with spindle 142), the spindle nut 144 is guided back without rotation (of its control contour) until it has reached its initial position between the control valves 36. Alternatively, the desired value generator 32 can displace the unit with the control valves 36 along the axis A. In order to improve the travel, the control contour of the spindle nut 144 can (in both alternatives) extend in a thread-like manner.

The cable 24 may be a steel, plastics or textile cable and the cable roll 22 may be constructed as a drum with a thread-like groove, which receives the cable 24. However, the cable 24 can also be a thin, for example, 4 mm wide, textile strap which is wound on itself on the cable roll 22. The cable 24 can also be a rollable belt which is similar to a safety belt, the cable roll 22 and the spring 28 acting as an automatic belt device.

The adjustment region, control region or switching point of the adjuster 20 can also be varied by the end of the cable 24 being secured at various locations or the gear mechanism 30 receiving a specific relative position of the toothed arrangements during assembly.

In place of the spatial proximity of the actuation element for the desired value generator 32 with respect to the adjuster 20 described, the adjuster 20 can also be positioned at another location of the vehicle seat, for example, directly next to the pneumatic spring 12 and, in addition to the air connections for the control valves 36 and the cable 24, can have as an interface for the actual value another input for the desired value, for example, a lever, Bowden cable or another cable.

While specific embodiments of the invention have been shown and described in detail to illustrate the application of the principles of the invention, it will be understood that the invention may be embodied otherwise without departing from such principles.

APPENDIX

List of Reference Numerals
   1 Vechicle seat
   3 Seat frame
   5 Lower frame
   7 Upper frame
   8a First crank
   8b Second crank
  10 Scissor shaft
  12 Pneumatic spring
  15 Seat rail
  16 Seat frame
  17 Backrest
  20 Adjuster
  22 Cable roll
  24 Cable
  26 Redirecting roller
  28 Spring
  30 Gear mechanism
  32 Desired value generator
  34 Control device
  36 Control value
  42 Sun whell
  44 Planet wheel
  46 Web
  48 Internally toothed wheel
  52 Inner sliding member
  54 Outer sliding member 56 Sliding roller
58 Rocker switch
142 Spindle
144 Spindle nut
A Axis

What is claimed is:

1. A vehicle seat comprising:
a pneumatic spring;
a seat frame which can be pivoted by means of the pneumatic spring and which is adjustable in terms of height;
an adjuster which establishes an actual value of height of the seat frame, for which the adjuster has a cable roll which is supported on a first portion of the seat frame so as to be able to be rotated about an axis, and a cable which can be at least partially wound on the cable roll, unwound therefrom and is secured to a second portion of the seat frame that can be moved relative to the first portion and which controls at least one control valve of the pneumatic spring in accordance with a desired value of the height of the seat frame;
a control device which controls the at least one control valve;
a seat frame height desired value generator by means of which a desired value of the height of the seat frame can be adjusted; and
a gear mechanism providing an operational gear connection between the cable roll, the desired value generator and the control device which controls the at least one control valve.

2. A vehicle seat according to claim 1, further comprising a spring wherein the cable roll is pretensioned relative to the first portion of the seat frame by means of the spring in order to keep the cable taut.

3. A vehicle seat according to claim 1, further comprising an actuation element for at least one of pivoting the desired value generator about the axis and directly or indirectly actuating the desired value generator by an occupant of the vehicle seat.

4. A vehicle seat according to claim 1, wherein the gear mechanism comprises a planet gear having a sun wheel which is supported rotatably about the axis, at least one planet wheel which engages with the sun wheel and which is rotatably supported on a web, and an internally toothed wheel which is supported rotatably about the axis and which engages with the at least one planet wheel.

5. A vehicle seat according to claim 4, wherein at least one of:
the sun wheel is connected to the cable roll; the internally toothed wheel is connected to the desired value generator; and the web is connected to the control device.

6. A vehicle seat according to claim 5, wherein at least one sliding member is connected to the web and coupled in a carrying manner with a viscous lubricant being introduced.

7. A vehicle seat according to claim 1, wherein the control device has at least one sliding member and a sliding roller which travels or slides on the at least one sliding member and which can in particular be deflected radially relative to the axis with respect to the at least one sliding member.

8. A vehicle seat according to claim 7, wherein the at least one sliding member comprises two sliding members which co-operate with the sliding roller and which can be adjusted in particular relative to each other.

9. A vehicle seat according to claim 7, wherein the control device has a rocker switch which is pivotable and which, in accordance with the deflection of the sliding roller relative to the at least one sliding member, acts on the at least one control valve.

10. A vehicle seat according to claim 1, wherein the gear mechanism comprises a spindle differential gear having a spindle which is arranged along the axis and a spindle nut which is screwed to the spindle, the spindle being connected to the cable roll and/or the spindle nut carrying the control device and/or the spindle nut being movable by means of the desired value generator on the spindle.

11. A utility vehicle seat comprising:
a pneumatic spring;
a seat frame which is adjustable in height;
a cable roll supported on a first portion of the seat frame so as to be rotatable about an axis;
a cable at least partially wound on the cable roll and being unwindable therefrom, the cable being secured to a second portion of the seat frame that is movable relative to the first portion;
a control device which acts on at least one control valve of the pneumatic spring;
a seat frame height desired value generator for adjusting a desired value of the height of the seat frame; and
a gear mechanism providing an operational gear connection between the cable roll, the desired value generator and the control device.

12. A vehicle seat according to claim 11, further comprising a spring wherein the cable roll is pretensioned relative to the first portion of the seat frame by means of the spring in order to keep the cable taut.

13. A vehicle seat according to claim 11, further comprising an actuation element for at least one of pivoting the desired value generator about the axis and directly or indirectly actuating the desired value generator by an occupant of the vehicle seat.

14. A vehicle seat according to claim 11, wherein the gear mechanism comprises a planet gear having a sun wheel which is supported rotatably about the axis, at least one planet wheel which engages with the sun wheel and which is rotatably supported on a web, and an internally toothed part which is supported rotatably about the axis and which engages with the at least one planet wheel.

15. A vehicle seat according to claim 14, wherein at least one of:
the sun wheel is connected to the cable roll; the internally toothed wheel is connected to the desired value generator; and the web is connected to the control device.

16. A vehicle seat according to claim 15, wherein at least one sliding member is connected to the web and coupled in a carrying manner with a viscous lubricant being introduced.

17. A vehicle seat according to claim 11, wherein the control device has at least one sliding member and a sliding roller which travels or slides on the at least one sliding member and which is deflected radially relative to the axis with respect to the at least one sliding member.

18. A vehicle seat according to claim 17, wherein the at least one sliding member comprises two sliding members which co-operate with the sliding roller and which can be adjusted in particular relative to each other.

19. A vehicle seat according to claim 17, wherein the control device has a rocker switch which is pivotable and which, in accordance with the deflection of the sliding roller relative to the at least one sliding member, acts on the at least one control valve.

20. A vehicle seat according to claim 11, wherein the gear mechanism comprises a spindle differential gear having a spindle which is arranged along the axis and a spindle nut which is screwed to the spindle, the spindle being connected to the cable roll and/or the spindle nut carrying the control device and/or the spindle nut being movable by means of the desired value generator on the spindle.

* * * * *